United States Patent Office 3,326,040
Patented June 20, 1967

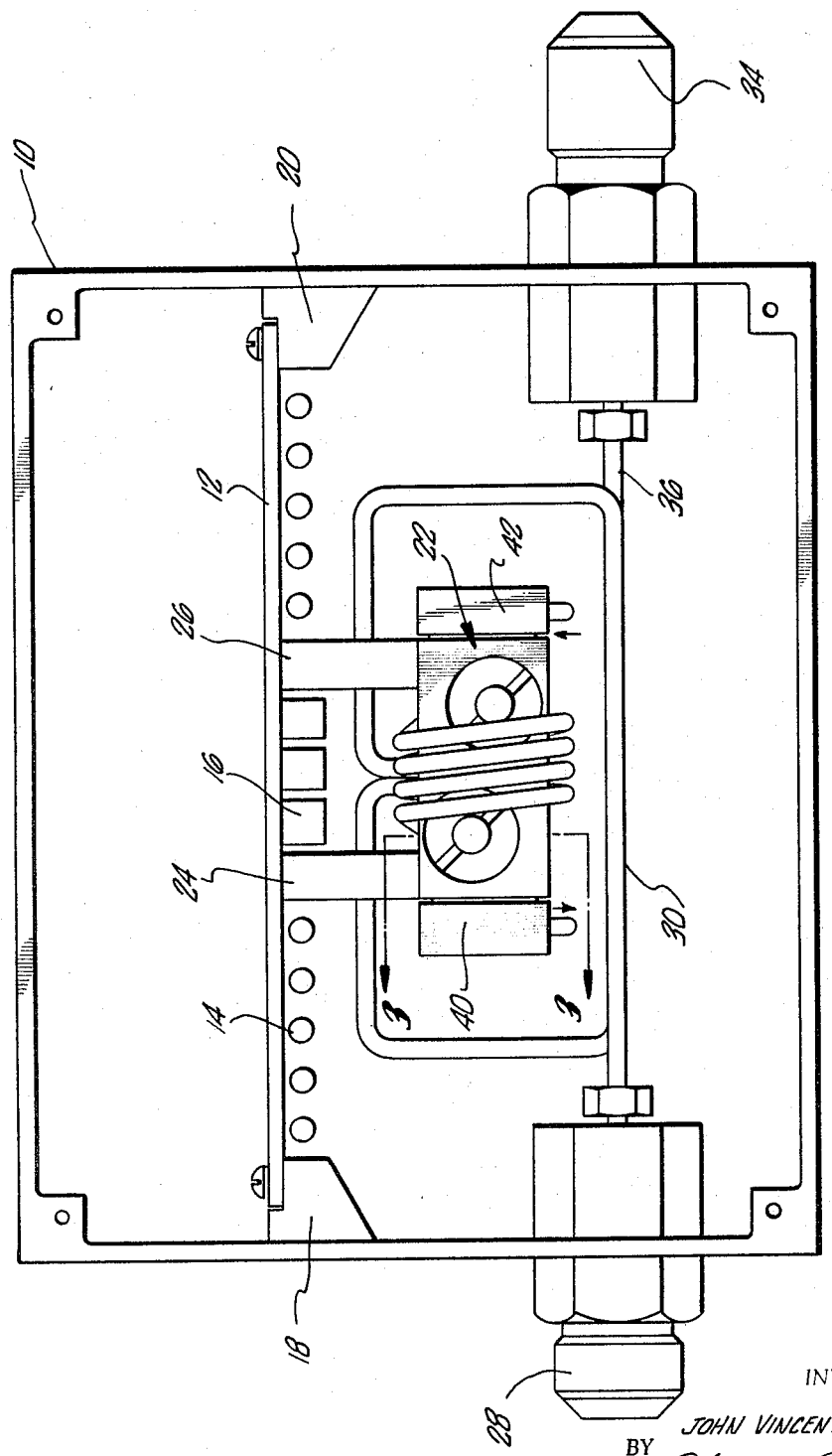

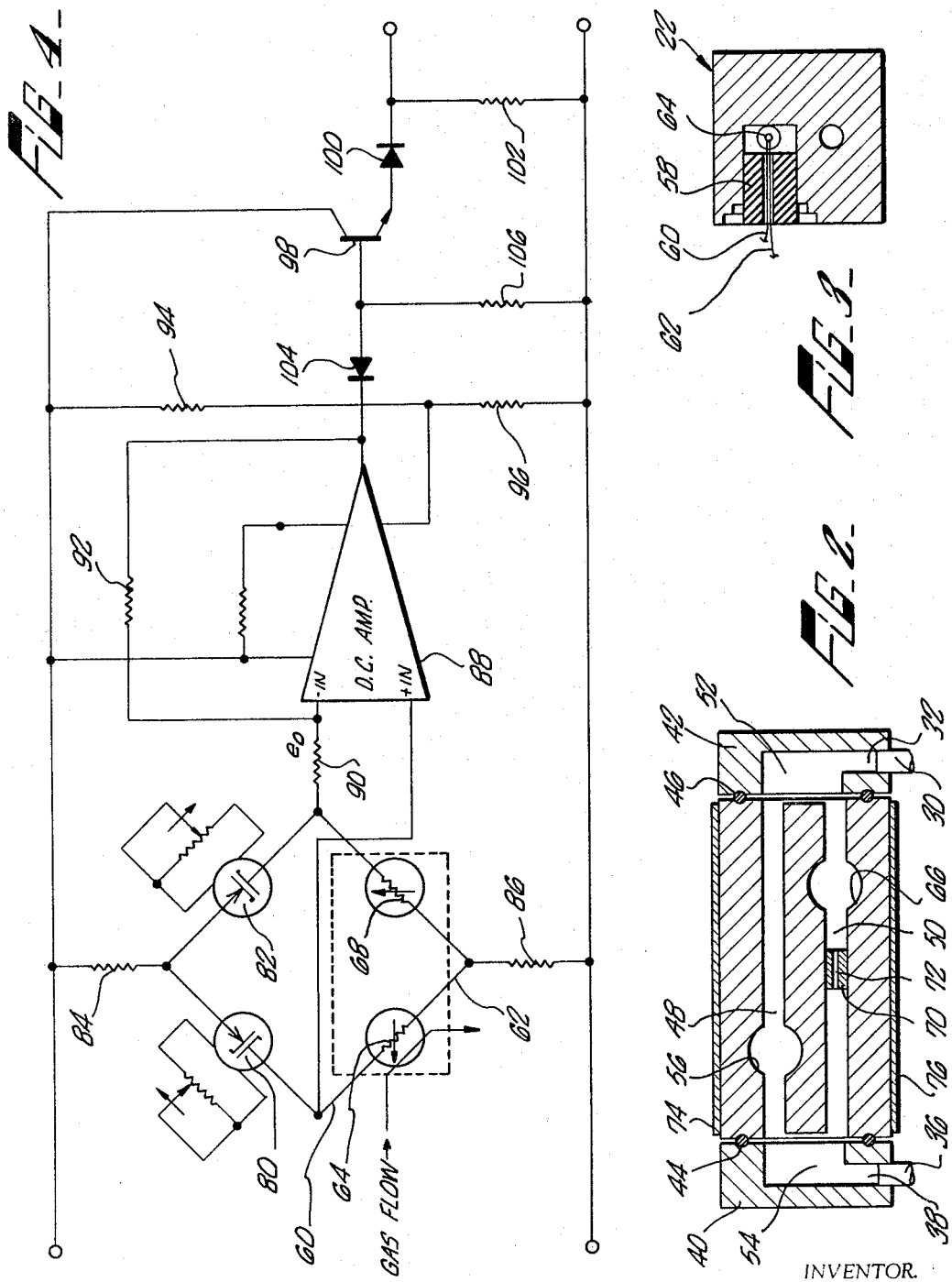

3,326,040
THERMAL FLOW METER
John Vincent Walsh, Monrovia, Calif., assignor to Consolidated Systems Corporation, Monrovia, Calif., a corporation of California
Filed June 15, 1964, Ser. No. 375,022
1 Claim. (Cl. 73—204)

This invention relates to fluid flow meters and, more particularly, is concerned with a flow meter based on thermal energy transfer from a temperature sensitive element to a moving fluid.

Various types of flow meter devices have been developed for measuring the flow rate of fluids. Mechanical types of flow meters are well known in which the fluid rotates a vaned element. Also flow meters are known in which the pressure drop occurring in a restricted flow of the medium is measured by some means. Such types of flow meters are inherently sensitive to viscosity and temperature changes and particularly, in the case of gases, to changes in pressure of the gas. Thermal flow meters have also been proposed in which changes in temperature of a heat sensitive element are measured to determine the changes in flow rate of a fluid past the heat sensing element. Such known types of thermal flow meters have not proved entirely satisfactory because they lack sufficient sensitivity, have been unstable in the presence of environmental changes which affected the temperature, the pressure, the density or viscosity of the fluid.

These and other limitation in the known prior art flow meters are overcome by the present invention in that a thermal flow meter is provided having increased sensitivity, improved response time, a large dynamic range of measurement, and which is highly stable under extreme variations in environmental conditions. This is accomplished by providing a thermal flow meter in which the internal pressure drop is very low and in which viscosity of the fluid is maintained constant by maintaining the temperature of the fluid constant. At the same time, means is provided for eliminating any thermal conductivity effects due to changes in the thermal properties of the fluid.

In brief, the advantages of the present invention are achieved by providing a flow meter in which the fluid is directed through a passage in a thermally conductive block which is maintained at substantially constant temperature. An active thermistor bead is mounted in the passage. The passage provides unrestricted flow to the fluid. A reference thermistor bead is mounted in a second passage which communicates with the first but which permits a very restricted flow of fluid therethrough so that the fluid in the region of the reference thermistor is substantially static compared to the unrestricted flow of fluid past the active thermistor. Both thermistors are connected electrically as arms in a bridge circuit. Unbalance of the bridge is amplified and the output used to indicate the flow rate of the fluid.

For a more complete understanding of the invention, reference should be made to the accompanying drawings wherein:

FIGURE 1 is a top view of one embodiment of the flow meter;
FIGURE 2 is a sectional view of the thermally conductive block;
FIGURE 3 is a sectional view taken substantially on the line 3—3 of FIGURE 1; and
FIGURE 4 is a schematic diagram of the circuit employed with the flow meter.

Referring to the drawings in detail, the numeral 10 indicates generally a frame in the form of a box in which the flow meter is mounted. The mounting is shown by way of example only as including an insulating panel 12 forming a printed circuit board for the electrical circuit, the electrical components, such as indicated at 14 and 16, being mounted on the circuit board in conventional fashion. The circuit board is secured to suitable mounting blocks or brackets 18 and 20 integral with the walls of the box 10.

The main body of the flow meter includes a block 22 made of a thermally conductive material such as aluminum, stainless steel or other suitable material which will not react with the class of fluids which are to be passed through the flow meter. The thermal block 22 is supported from the circuit board panel 12 by a pair of mounting members 24 and 26.

The inlet to the flow meter includes a coupling 28 mounted in one wall of the box 10 to which is connected a length of tubing 30 inside the box 10. The tubing 30 extends in a loop through the mounting member 26 and then takes several turns around the block 22 before communicating with the interior of the block 22 at an inlet port 32. Similarly, an output from the flow meter is provided by a coupling unit 34 passing through the opposite wall of the box 10 to which is connected a length of tubing 36. The tubing 36 extends parallel to and in contact with the tubing 30 and extends in a loop through the mounting member, making several turns around the thermal block 22 before connecting with an outlet port 38. The arrangement of the inlet tubing 30 and the outlet tubing 36 is such as to provide a heat exchanger for transferring heat between the fluid in the inlet and outlet tubing and also between the tubing and the thermal block 22.

Referring to the FIGURES 2 and 3, the details of the thermal block 22 are shown. Preferably, the thermal block 22 is formed with a pair of end members 40 and 42 which are held in place by screws (not shown) entering the block 22 or other suitable clamping means. O-rings, such as indicated at 44 and 46, are provided to effect a fluid tight seal at the interfaces.

The interior of the block 22 is provided with two parallel passages 48 and 50 which extend lengthwise through the center section. These two passages are connected to the inlet port 32 by a chamber 52 in the end member 42. Similarly, the other ends of the two passages 48 and 50 communicate with the outlet port 38 through a chamber 54 in the end member 40. The block is provided with a first bore 56 which intersects the passage 48. An insulating sleeve 58 is inserted in the bore 56. A pair of electrical leads 60 and 62 extend through the insulating sleeve 58 and are cemented or otherwise secured in position, the leads supporting a thermistor bead 64 in the passage 48. As will be hereinafter explained in detail, the thermistor bead 64 is the active element for measuring fluid flow rate through the passage 48.

Similarly, a bore 66 intersects the passage 50 and a reference thermistor bead 68 (not shown in FIGURES 1–3 but shown in the schematic of FIGURE 4) is similarly mounted in the bore 66 to provide a reference sensing element. The passage 50 to the right of the bore 66 is preferably enlarged to give fluid access between the thermistor bead 68 and the inlet port 32. A reference flow control element 70 is inserted in the passage 50 to the left of the bore 66, the element 70 having a metering passage 72 therethrough for restricting the flow of fluid through the passage 50. In this manner, the reference thermistor 68 is not subject to flowing fluid, but the passage 50 can purge itself when the nature of the fluid is changed.

In order to maintain the block 22 at constant temperature, strip heaters, such as indicated at 74 and 76, are applied to the outer surface of the block. The heaters are thermostatically controlled to maintain the block at substantially constant temperature in any well known manner.

Referring to FIGURE 4, it will be seen that the active thermistor element 64 and reference thermistor element 68 are connected as two adjacent arms of a bridge. The other two arms of the bridge are provided with constant current devices 80 and 82. It is essential to achieve fast response time and high sensitivity with changes in flow rate that the current through the two thermistor beads be held substantially constant. Rather than solid state devices, constant current can be achieved by using large resistors in combination with a high voltage source so that current is unaffected by the relatively small changes in resistance of the thermistors. The bridge circuit is connected across one diagonal to a DC potential source (not shown) through resistors 84 and 86. The other diagonal of the bridge is connected to the inputs of a differential amplifier 88, which may, for example, be a solid state amplifier known as a Filbrick PP65 type amplifier. The amplifier 88 is used as an operational amplifier with a series input resistor 90 connecting one end of the reference thermistor arm of the bridge to one input of the amplifier and a feedback resistor 92 connecting the same input to one output of the amplifier. The DC amplifier may be powered by the same DC source as the bridge.

The common output terminal of the amplifier 88 is connected to the midpoint of a voltage divider including series resistors 94 and 96 connected across the potential source. The other output terminal of the amplifier 88 is connected through a matching network which includes an emitter-follower provided by a transistor 98 having its collector connected directly to the positive side of the potential source and its emitter connected through a diode 100 and output load resistor 102 to the other side of the DC source. The output signal is derived across the resistor 102. A zener diode 104 couples the output of the amplifier to the base of the transistor 98 and a bias resistor 106 connects the base of the transistor 98 to the negative side of the potential source.

In operation, the input coupling 28 is connected to a source of fluid. For example, the fluid source may provide a gas flow of from ten to fifteen hundred cc. per minute. The source preferably should be one of high pressure and high impedance to fluid flow so that slight variations in pressure drop through the flow meter do not affect the flow rate. As the fluid passes through the inlet tubing 30 through the passages in the block 22 and out the outlet pipe 36, it is brought to substantially the temperature of the block by the heat exchanger arrangement of the tubing with the thermostatically controlled block. Within the thermal block 22, a portion of the fluid enters the passage 50 and comes in contact with the reference thermistor 68. However, because of the reference flow control element 70, there is no appreciable movement of fluid through the passage 50. The main flow of fluid is through the passage 48 past the active thermistor element 64.

In the absence of any fluid flow through the passage 48, the thermistor elements are heated up to some temperature substantially higher than the temperature of the surrounding block by virtue of electrical losses in the thermistor elements. By using a matched pair of thermistors, the bridge is balanced and no output is derived from the DC amplifier 88. Heat loss from the thermistor elements to the block due to the difference in temperature is by radiation, by thermal conduction through the supporting leads and the insulating sleeve, by conduction through the fluid and by forced and natural convection within the fluid. By the arrangement of the present invention, heat loss by radiation is the same for both the active and reference thermistor elements. Likewise, since both elements are surrounded by the fluid, conduction through the fluid is the same for both elements as is conduction through the supporting leads. However, in the presence of fluid flow through the passage 48, the molecules of the fluid, which are at the temperature of the block, absorb energy from the active thermistor bead on collision. The number of collisions and therefore the rate of transfer of energy from the bead to the fluid is greater for the active thermistor and the reference thermistor in the presence of any flow through the passage 48. The rate at which energy is transferred from the active thermistor bead to the fluid is a logarithmic function of the flow rate of the fluid through the passage 48.

As the active thermistor element gives up heat to the gas, its temperature begins to drop slightly in relation to the reference thermistor element 68. As a result, its resistance begins to increase slightly, producing an increase in the voltage drop across the active thermistor bead. The resulting unbalance of the bridge is amplified to provide an output signal that is a measure of flow rate. The output signal can be used to drive a suitable indicating device such as a meter, a strip recorder, or the like.

What is claimed is:

A flow meter for measuring the flow of a fluid, including, a common input passage, a common output passage, a thermally conductive block having first and second passages therethrough, the passages being coupled in parallel to the common input passage and the common output passage, first and second thermistor beads positioned respectively in the first and second passages, the beads being thermally and electrically insulated from the block, means in the first passage for restricting the flow of fluid through the first passage, means for maintaining the block at a substantially constant temperature, an electrical impedance bridge circuit having four arms each connected in series to a pair of other arms in the bridge to define diagonals between particular pairs of arms in the bridge, means for electrically connecting the two thermistor beads to define a pair of the adjacent arms of the bridge, a potential source connected across a first one of the diagonals of the bridge for passing currents through the two beads to heat the beads electrically to a temperature higher than the temperature of the block, and means for sensing any unbalance of the bridge across a second one of the opposite diagonals of the bridge due to unequal resistance changes of the two thermistors.

References Cited

UNITED STATES PATENTS

| 2,859,617 | 11/1958 | Adams | 73—204 |
| 2,947,938 | 8/1960 | Bennett | 73—204 X |

FOREIGN PATENTS

| 1,238,716 | 7/1960 | France. |
| 1,362,227 | 4/1964 | France. |

RICHARD C. QUEISSER, *Primary Examiner.*

J. C. GOLDSTEIN, *Assistant Examiner.*